United States Patent
Iyer et al.

(10) Patent No.: US 6,446,098 B1
(45) Date of Patent: Sep. 3, 2002

(54) METHOD FOR CONVERTING TWO-DIMENSIONAL DATA INTO A CANONICAL REPRESENTATION

(75) Inventors: Prakash Iyer, San Jose; Piyush Goel, Monte Sereno; Rajeev Mohindra, Castro Valley; Amitabh Sinha, Los Altos; Prasad Krothapalli; Ronald Mak, both of San Jose; Shashi Vittal, Santa Clara, all of CA (US)

(73) Assignee: Everypath, Inc., San Jose, CA (US)

( * ) Notice: Subject to any disclaimer, the term of this patent is extended or adjusted under 35 U.S.C. 154(b) by 0 days.

(21) Appl. No.: 10/055,060

(22) Filed: Jan. 22, 2002

Related U.S. Application Data

(63) Continuation of application No. 09/394,120, filed on Sep. 10, 1999.

(51) Int. Cl.[7] .............................................. G06F 17/23
(52) U.S. Cl. ...................................... 707/513; 707/523
(58) Field of Search ................................ 707/100, 101, 707/501.1, 513, 522, 523

(56) References Cited

U.S. PATENT DOCUMENTS

| | | | |
|---|---|---|---|
| 5,899,975 A | 5/1999 | Nielsen ....................... 704/260 |
| 5,915,259 A * | 6/1999 | Murata ........................ 707/513 |
| 6,018,710 A | 1/2000 | Wynblatt et al. ............. 704/260 |
| 6,078,924 A * | 6/2000 | Ainsbury et al. ............ 707/101 |
| 6,085,196 A | 7/2000 | Motoyama et al. .......... 707/102 |
| 6,115,686 A | 9/2000 | Chung et al. ................ 704/260 |
| 6,115,723 A | 9/2000 | Fallside ....................... 707/513 |
| 6,154,754 A * | 11/2000 | Hsu et al. .................... 707/513 |
| 6,167,409 A | 12/2000 | DeRose et al. .............. 707/513 |
| 6,167,448 A | 12/2000 | Hemphill et al. ............ 709/224 |
| 6,185,535 B1 | 2/2001 | Hedin et al. ................. 704/270 |
| 6,266,615 B1 | 7/2001 | Jin .............................. 701/213 |
| 6,269,336 B1 | 7/2001 | Ladd et al. .................. 704/270 |
| 6,279,015 B1 | 8/2001 | Fong et al. .................. 707/523 |

FOREIGN PATENT DOCUMENTS

EP     0 848 373 A2    6/1998

OTHER PUBLICATIONS

Fernandez et al., "Catching the boat with Strudel: experiences with a Web–site management system", Proceedings of the 1998 ACM SIGMOD International Conference on Management of Data, pp. 414–425.*

Hosoya et al., "Regular expression pattern matching for XML", Proceedings of the 28th ACM SIGPLAN–SIGACT Symposium on Principles of programming languages, volumn 28, 2001, pp. 67–80.*

* cited by examiner

Primary Examiner—Stephen S. Hong
(74) Attorney, Agent, or Firm—Pillsbury Winthrop LLP

(57) ABSTRACT

A method is provided for converting two-dimensional data, particularly information in HTML format, into a canonical representation for rendering in aural or other visual forms wherein each element of interest is selected based on it being part of a mathematically regular expression, namely any expression that can be parsed in a tree. To perform the selection, the container of the element is located, and then the local route of the element within the parsed tree is followed, such that a signature of the element built upon this identification can be constructed and stored for later use in retrieving and rendering the value of the element of interest. The element of interest can thereafter be rendered through an appropriate language translator of interest to the querier. As a further refinement of the invention. the method searches for repeated elements and then stores only one of the selected repeated elements, such as the first repeated element.

10 Claims, 4 Drawing Sheets

METHOD FOR CONVERTING TWO-DIMENSIONAL DATA INTO A CANONICAL REPRESENTATION

This application is a Continuation of U.S. patent application Ser. No 09/394,120 filed Sep. 10, 1999.

BACKGROUND OF THE INVENTION

This invention relates to customization of data into a representation suitable for presentation in different formats, including aural and limited visual formats. This invention relates specifically to selection of data in a HyperText Markup Language (HTML) so that it is suited for rendering in another form such as an audio format or a visual format other than the source format.

A great deal of valuable information is now available in HTML format. However, HTML is primarily designed for access in a specific visual context, namely by means of a graphical user interface of the type designed for use with web browsers. There is a need to make HTML data accessible via other interfaces and readers. The invention herein described is intended to address an important aspect of that need.

SUMMARY OF THE INVENTION

According to the invention, in a computer network system, a method is provided for converting two-dimensional data, particularly information in HTML format, into a canonical representation for rendering in aural or other visual forms wherein each element of interest is selected based on it being part of a mathematically regular expression, namely any expression that can be parsed in a tree. To perform the selection, the container of the element is located, and then the local route of the element within the parsed tree is followed, such that a signature of the element built upon this identification can be constructed and stored for later use in retrieving and rendering the value of the element of interest. As a further refinement of the invention, the method searches for repeated elements and then stores only one of the selected repeated elements, such as the first repeated element.

It is an important recognition of the present invention that HTML pages can be represented by regular expressions. It is also an important recognition of the invention that only elements need to be selected, and that the actual values of the elements need not be selected, thus permitting the values to be dynamically updated and rendered with the current value.

The invention will be better understood by reference to the following detailed description in conjunction with the accompanying drawings.

DESCRIPTION OF THE SPECIFIC EMBODIMENTS

Figure 1:
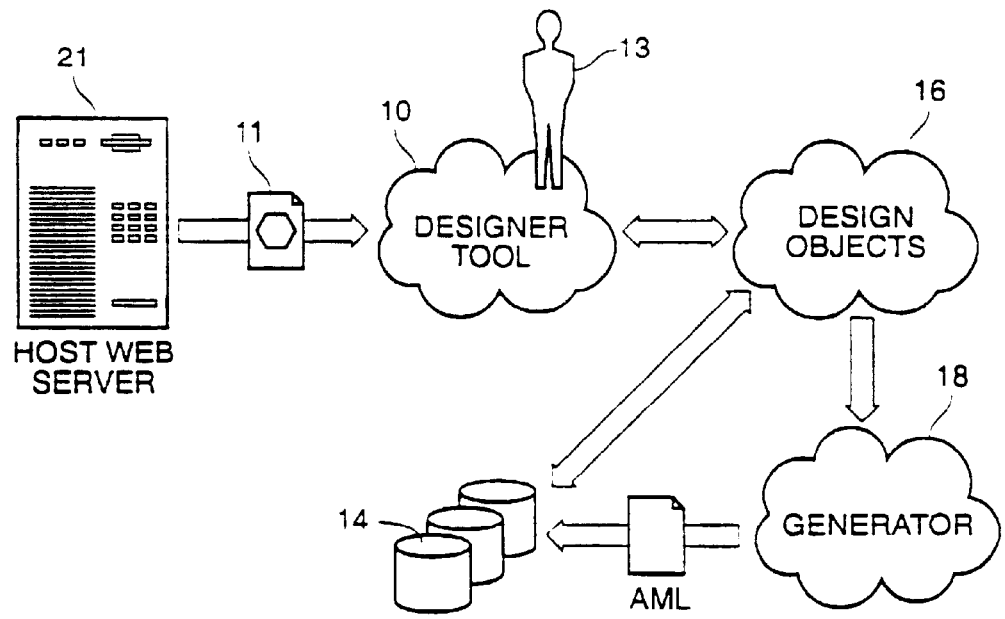
FIG. 1 is a block diagram of a system according to the invention in which a design tool is employed to select and identify elements HTML pages.

Referring to FIG. 1, the invention is explained in the context of a web page in the world web. On the web, an interactive designer tool 10 according to the invention is employed to customize web pages 11 written in a mathematically regular form such as HTML found on a source web site located on a host server 12 after first copying the desired web pages to a storage means 14. The storage means 14 may be a shared persistent store such as a bank of disk drives or other database storage means with persistent storage. By using the designer tool 10 as hereinafter explained, designers can select and identify and customize information from an existing web application without disturbing the source web application. To customize each web page, the designer determines what text and prompts will be rendered to the user, typically a telephone caller if an aural interface is the target, what input data the caller needs to provide for input components, and what order the caller will visit any audio-enabled pages. The designer creates design objects 16. The output of the design process in a particular embodiment is audio metadata. This metadata is represented via a script, specifically herein called collections of elements, which are stored in a database of the storage means 14. The runtime engine hereinafter described uses this script to enable callers to interact with an audio enabled Web site.

The interactive designer tool 10 in operation acts like a web browser to the host Web server 12 in that it queries and downloads the site's HTML pages 11. The designer/user of the tool 10 decides which pages to audio-enable. For each such page, the designer selects the information that will be rendered at runtime. The designer may create vocal prompts that will ask the caller to provide data for the page's input controls. The designer may further decide what words and phrases will be recognized as proper responses from the caller in response to each prompt. For example, if the Web page has a drop-down selection list for choosing a color, the prompt could be "Please choose red, white, or blue." The designer specifies that the caller should respond by saying either "red," "white," or "blue."

The designer also specifies the audio control flow. Within a single Web page, the intra-page flow determines the order that text will be read and which prompts will be issued to the caller. Inter-page flow determines the order that the caller will visit the audio-enabled pages of the site. The audio path followed through a Web site is typically similar to a visual path using a visual Web browser.

The designer tool 10 is provided with components to create a set of design objects that are kept in the storage means 14. These objects encapsulate all the information necessary to audio-enable a Web site. The designer tool can retrieve these objects from the storage means 14, update them, and save them back into the storage means.

Upon saving the design objects 16 to the storage means 14, the designer tool 10 invokes a generator 18 to create textual script written in a specification language called herein AML. The AML scripts encode information extracted from the design objects 16 that will be rendered at the run time. Each script contains the IRL of its corresponding Web page. Since the URLs and AML scripts are used at run time. AML scripts are also kept in the storage means 18. The values on the web pages are expressed using AML.

A. Component selection, identification and customization

During a design process, component selection and customization consists of the following steps:

1. Selection of components from an existing HTML page;
2. Identification of selected components from the HTML page;
3. Customization of selected components from the HTML page;

4. Specification of the selected and customized components via a language that is functionally complete in expressing any selection and customization required.

The above technique of design is controlled and implemented by the user interface, freeing the designer from the details and the underlying algorithms that are required to correctly select, identify and generate AML scripts.

B. Selection and identification of components from HTML pages

Figure 2:
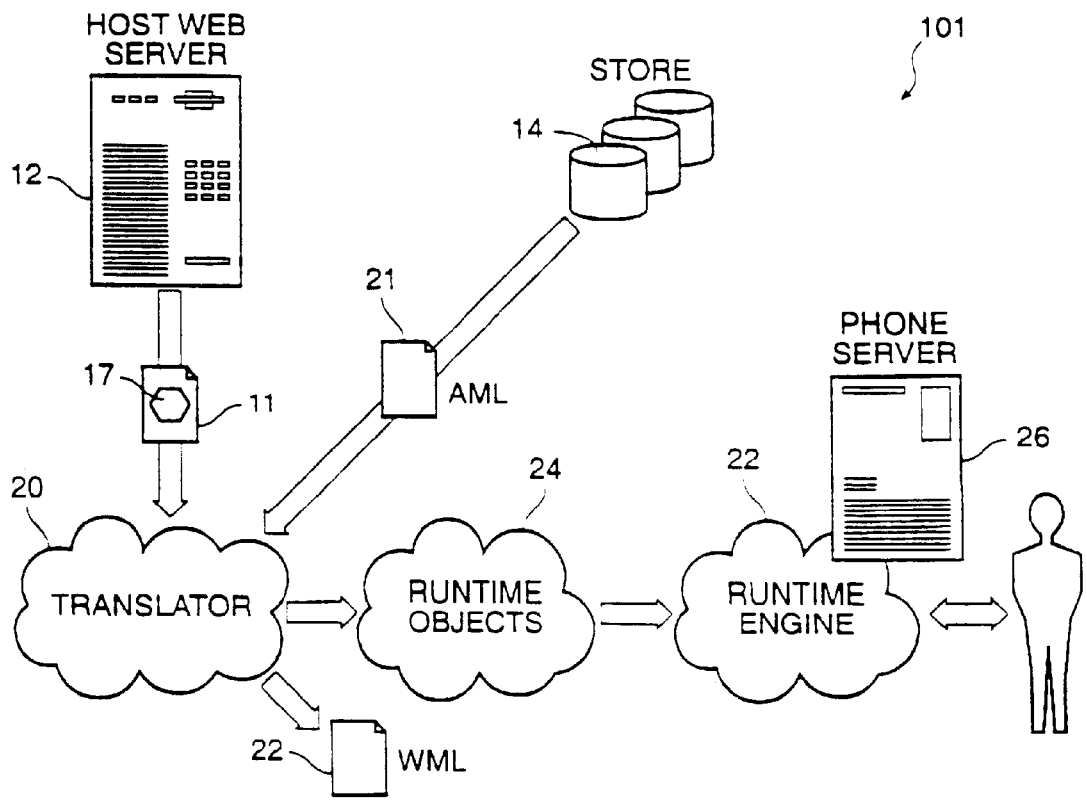
FIG. 2 is a block diagram illustrating in greater detail the functional relationships of identification, extraction, and translation.

FIG. 2 is a conceptual depiction of a runtime system for selecting and rendering data from an HTML page into a target viewing aural rendering language. The web pages 11 are retrieved from the host web server 12 into a translator 20, which in turn retrieves corresponding AML documents 21 from the shared persistent store 14 to produce WML pages 23 and runtime objects 24. After a designer 13 has selected some data, henceforth called a "component" 17, from an HTML page 11 by pointing and clicking on it, the designer tools 10 (FIG. 1) automatically generate a unique signature that is subsequently employed by the runtime environment via the runtime engine 22 in order to extract real time data from the HTML page. The runtime engine 22 interfaces with the phone server 26 and the user 28. The signature of the component 11 may comprise one or more of the following:

1. The position of the component 17 on the HTML page. Consider the following simple HTML page (This code will produce an HTML page if executed by a web browser operating on a client computer):

```
<HTML>
  <table name="T1">
    <tr>
      <td width="13%">Row 1</td>
      <td width="13%" align="center">r1c2</td>
      <td width="66%" align="center">r1c3</td>
      <td width="8%"><p align="center">r1c4</td>
    <\tr>
    <tr>
      <td>
        <form method="POST" name="Form 1" action=
          "WEBBOT-SELF">
          <input type="checkbox" name="C1" value=
            "ON">
          <input type="radio" value="V1" checked name=
            "R1">
          <input type="radio" name="R1" value="V2">
        <\form>
      <\td>
    <\tr>
  <\table>
<\HTML>
```

In the above example, if a designer 13 (FIG. 1) selects the entire table T1 and if it is always the first table on the HTML page, then table T1 can identified by its position as "1" with the signature being the symbol representing "the first table on the HTML page."

2. Attributes of the component. Consider the above example in which the second row of table T1 contains form Form 1. If a designer 13 selects Form 1, then it can be uniquely identified by its action attribute. If this is the only form with value WEBBOT-SELF for this attribute then the identifier of this attribute-value pair becomes the signature of Form 1.

3. The ancestors of the component, i.e., the identification of other components on the page which associate with the component. Unlike the foregoing cases where the signature of a component is determined by its one of properties such as position or attribute-value pair, the signature of a component could depend on the identification of other components in the HTML page. Any HTML page can be represented by a regular expression. For example, consider the above HTML page. If the syntax A(B) is used to imply that component A contains B within the scope of component A, then the above simple HTML page can be expressed as HTML (T1 (tr tr (td (Form 1 (C1 V1 R1))))). Furthermore, the identification of a given component in a mathematically regular expression depends on the ancestor components that contain the given component. Consequently, the identification of Form 1 depends on the identification of the enclosing components such as HTML, Table T1, and so on. By recursively identifying these enclosing elements, one can uniquely identify form Form 1. For example, Form 1 can be uniquely identified by identifying container T1, second tr in T1 and td with in the second tr. Thus, form Form1's signature is: "look for highest level container HTML, within HTML container look for container table T1, with in container T1, look for second row container and with in this container look for first cell which contains form Form1".

4. The "left" siblings of the component, in addition to the identification of its ancestor components. The identification of left siblings is required in the case when one or more left siblings of component repeats a number of times. In this case, it is necessary to identify these left siblings as well. Consider the following HTML page:

```
<HTML>
  <table name="T1">
    <tr>
      <td width="13% ">Row 1</td>
      <td width="13%" align="center">r1c2</td>
      <td width="66%" align="center">r1c3</td>
      <td width="8%"><p align="center">r1c4</td>
    <\tr>
    <tr>
      <td>12.5<\td>
      <td>2.5<\td>
      <td><form method="POST" name="Form1"
        action="WEBBOT-SELF">
        <input type="checkbox" name="C1" value=
          "ON">
        <input type="radio" value="V1" checked name=
          "R1">
        <input type="radio" name="R1" value="V2">
      <\form>
      <\td>
    <\tr>
  <\table>
<\HTML>
```

In the above example, the second row of Table T1 contains an initial set of columns that contain digits in them. If the number of these columns varies from one instantiation to the next instantiation of the HTML page, then the identification of form Form1 requires identification of these repeating columns. Thus, can be uniquely identified by identifying container T1 that contains second <tr> which in turn contains repeating <td>'s containing digits (12.5 & 2.5. respectively) and the final <td> containing form Form1. In this case, the signature of component Form1 will be: "look for highest level container HTML, within HTML container look for container table T1, within container T1, look for second row container and within this container look for container <td> that repeats 'n' times, followed by last container <td> that contains form Form1".

5. A pattern extracted from the HTML page. Consider the previous example. If Form1 is always expected to contain three inputs, then these inputs provide the identification for the form. Thus its signature is: "look for a form that contains three inputs with pattern for the first input is:
   <input type="checkbox" name="C1" value="ON">.
the pattern for the second input is:
   <input type="radio" value="V1" checked.>".

Sometimes the final signature of a component may consist of a combination of methods described above. However, once the signature of the component is established, it is considered the canonical representation, that is, the representation which uniquely and most compactly identifies the component and its associated attributes.

Figure 3A:
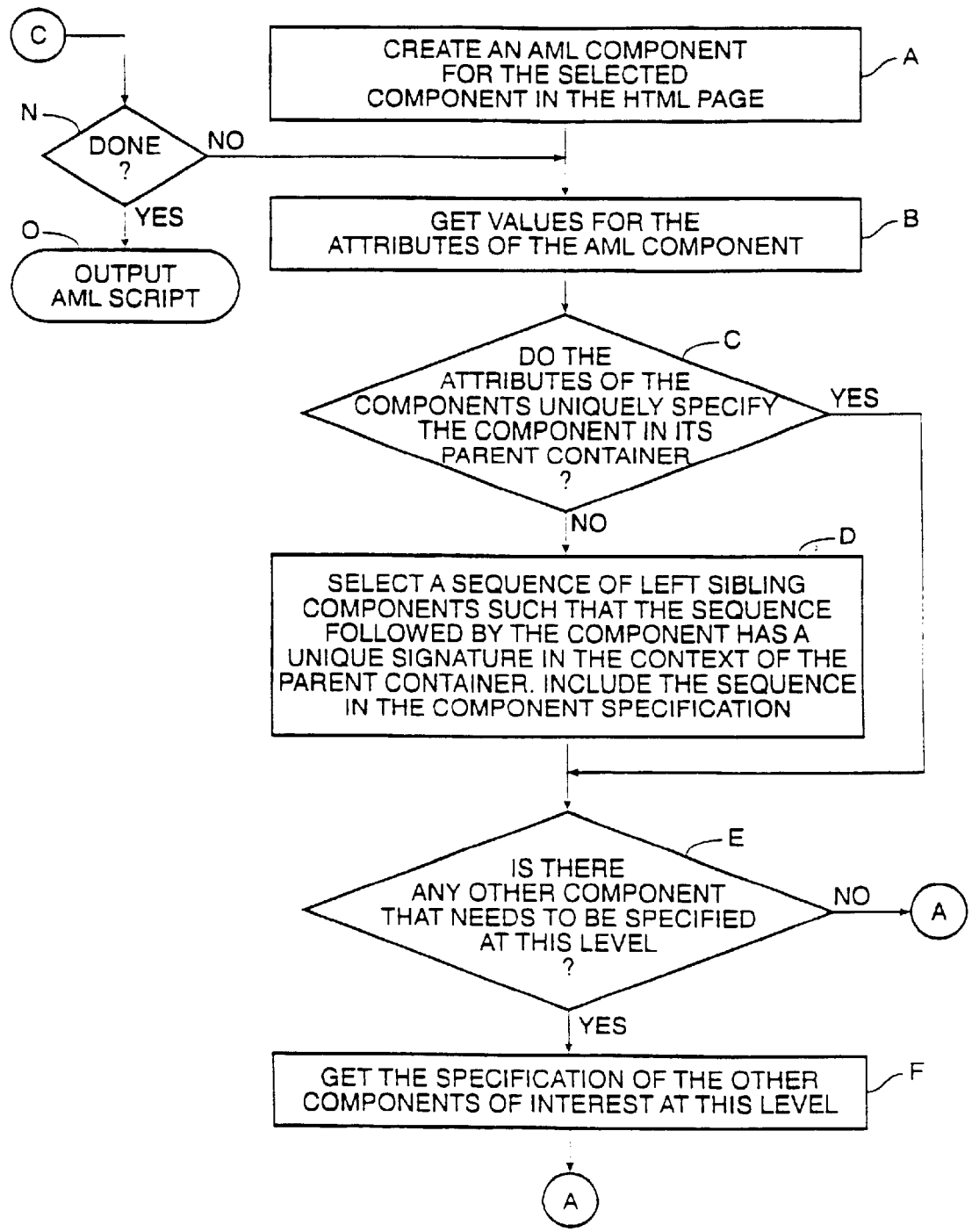
FIGS. 3A and 3B are a flow chart of a method according to a specific embodiment of the invention.
Figure 3B:
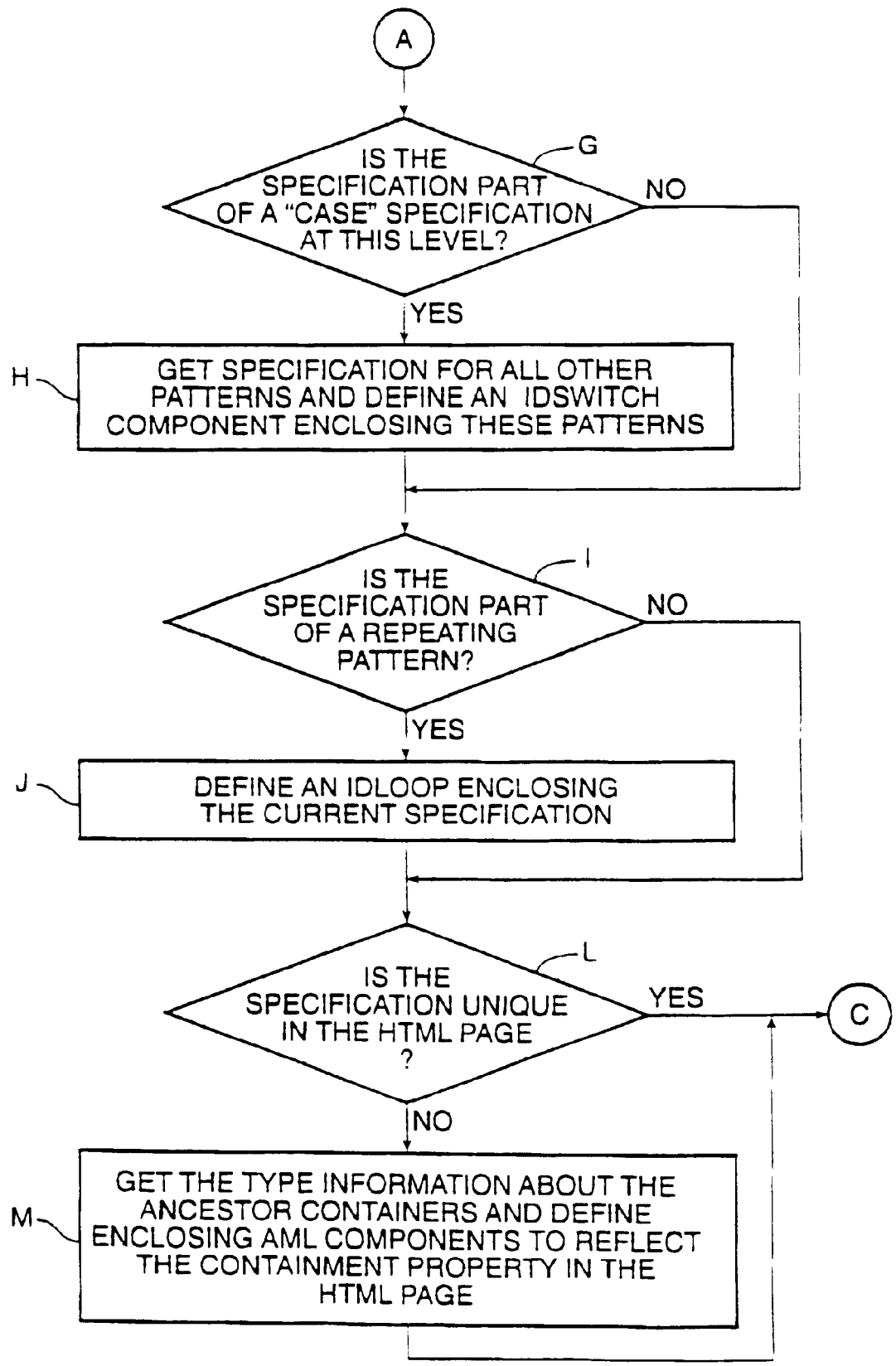

FIGS. 3A and 3B provide an overview of the identification algorithm that implements the methods according to the invention. The input to the identification algorithm is a component selected by a designer and the output of the algorithm is a script in a target language, a form of markup language, herein called AML (described in the next section) that specifies the complete signature of the selected component.

First a component of the target language, in this case the AML language, is created for the source language component, in this case the HTML component, as selected by the designer (Step A). Then the values for the attributes of that AML component are obtained or retrieved (Step B). The attributes are tested to determine if the attributes of the components uniquely specify the component in its parent container (Step C) and continues. If not, then a sequence of "left" sibling components is selected such that the sequence followed by the component has a unique signature in the context of the parent container. This sequence is then included in the component specification (Step D). With the uniqueness specification of components, all other components are tested to determine if they need to be specified at this level (Step E). If so, then the specification of the other components of interest at this level is obtained (Step F).

The following steps focus on uniqueness in the specifications. Having thus gotten the specification of separately specified components, the specifications are each tested to determine if the subject specification is part of a case-type specification at the current level (Step G). If it is, then the specification for all other patterns are retrieved or obtained and an identification switch component (IdSwitch) is defined which is used to enclose the patterns so obtained (Step H). Each specification is thereafter tested to determine if it is part of a repeating pattern (Step I). If so then an identification loop (IdLoop) is defined which encloses the current specification (Step J). The specification is then tested against other specifications on the same HTML page to determine if the specification thus defined is unique (Step L). If not then the type information about the ancestor containers is retrieved and enclosing AML components are defined to reflect the containment property in the HTML page (Step M). The process cycle is repeated for all AML components selected by the designer until done (Step M), finally outputting an AML script (Step O).

A computer language according to the invention must meet certain requirements in order to specify the identification and customization steps of the selected components. The language used according to the invention herein called AML complies with these requirements. Additionally, this language is also XML compliant.

In order to correctly express any combination of methods employed for identification (as per the algorithm detailed in connection with FIGS. 3A and 3B), the target markup language must be able to specify the following:
   It should be able to specify HTML elements alone with all their relevant attributes.
   It should be able to describe any regular expression.
   It should have advanced constructs such as switch, case, loop, etc that are useful in describing alternate and repeating components, respectively.
   It should be able describe concatenation of HTML elements.
   It should be able to describe string pattern.

The AML language according to the invention meets the above requirements. It views an HTML page in terms of its components as herein defined: forms, tables, and lists. A description of a component is split into three parts:
   Identification: The identification is used to identify various components on the HTML page.
   Extraction: The extraction is used to specifies how data is extracted from the components selected.
   Translation: The translation specifies how the components are rendered over the phone.

All the identifications, extractions, and translations for the components on a given HTML page are collectively placed in a dialogue.

Figure 4:
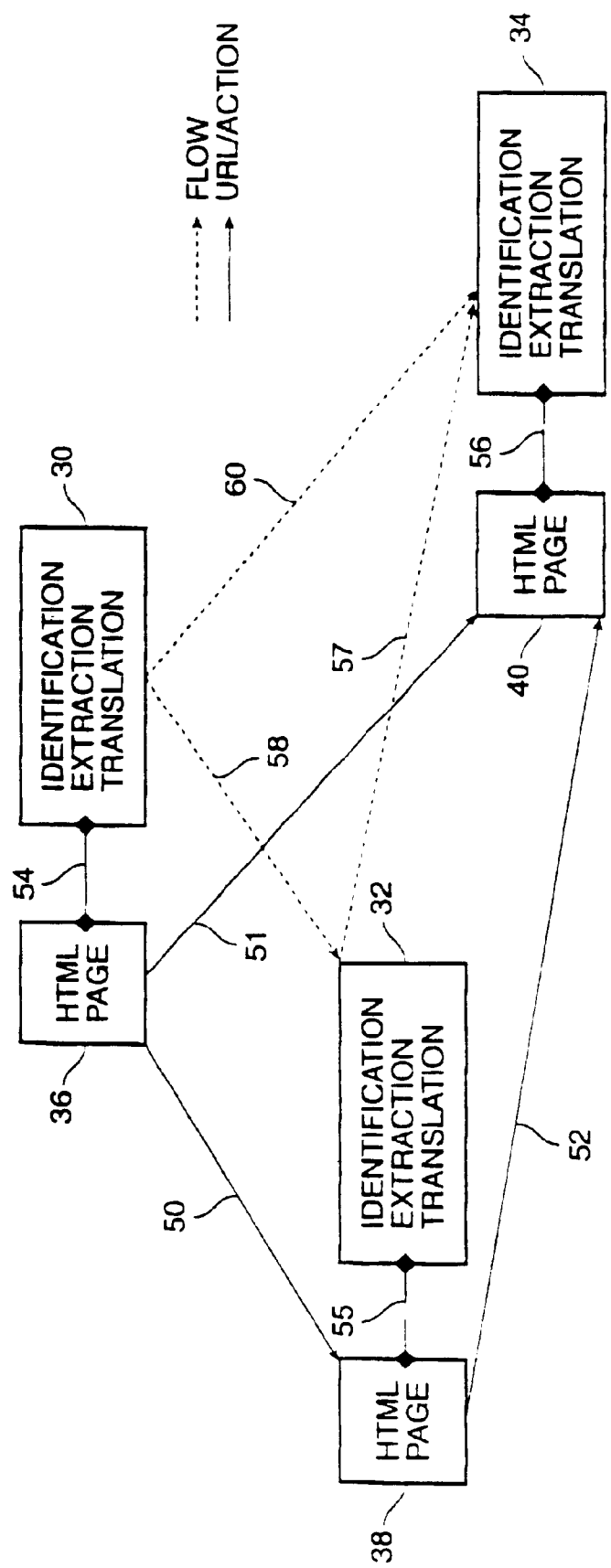
FIG. 4 is a block diagram of the relationship of HTML pages and processing triplets.

FIG. 4 is a diagram chart illustrating the association of identification/extraction/translation triplets with each HTML page and the association of flow elements with each url/action transition between HTML pages. An HMTL page 36 has associated HTML pages 38 and 40 to which it is nominally a parent. Each HTML page is connected by a url/action transition 50, 51, 52. Moreover. each identification/exraction/translation triplet 30, 32, 34 is associated with a corresponding HTML page 36, 38, 40 by a url/action transition 54, 55, 56. However, there is also the flow of information among the triplets along information paths 58, 59, 60. The following sections describe in greater detail the components, identification methods, extraction methods and the underlying grammer that are embodied in a specific example of AML according to the invention.

C. Identification & Extraction

A component is identified using the element "component", where the value for all attribute value pairs inside any element is herein rendered in quotations to set it off as a value. Thus a row can be identified as component A as follows:
   <component name="A" type="tr"> </component>

The type of a component corresponds to an HTML tag.

Components may recursively contain components using a nested component notation. Thus, the following notation expresses that component A is contained within component B:
   <component name="B" type="table">
     <component name="A" type="tr"> </component>
   </component>

Further components may be repeated multiple times using the "idloop" element. Thus, the following notation means that the component named A can appear multiple times:
   <idloop name="aloop">
     <component name="A" type="tr">
     </component>
   </idloop>

A component can be composed of two alternate components. The following notation expresses that component A is made up of either component X or component Y:
   <component name="A" type="form">
     <idswitch name="switch1">
       <idcase define="pattern1">
         <component name="X" type="input">
         </component>

```
        </idcase>
        <idcase define="pattern2">
            <component name="Y" type="select">
            </component>
        </idcase>
    </idswitch>
</component>
```

This illustrates provision of the ability to express regular expressions:

- Parent-child relationship is expressed by nesting; in shorthand notation A(B) specifies that A is parent of B.
- Repitition is expressed by idloop: in shorthand notation A* specifies that A is repeated
- OR is expressed by switch: in shorthand notation A/B specifies that either A or B exists
- AND is expressed by concatenation: in shorthand notation AB specifies that A is followed by B.

For example, the regular expression A(B/C)*D—where A is the parent of a idloop or-expression of components B and C, followed by a component D—can be written as:

```
<component name="X" type="type1">
<component name="A" type="type2">
    <idloop name="loop1">
        <idswitch name="switch1">
            <idcase define="pattern1">
                <component name="B"
type="type3"></component>
            </idcase>
            <idcase define="pattern2">
                <component name="C"
type="type4"></component>
            </idcase>
        </idswitch>
    </idloop>
</component>
    <component name="D" type="type5"> </component>
</component>
```

The name of a component, or an idswitch or an idloop, could be used as a variable. A variable defined inside an idloop has several instances. An instance is specified by qualifying the variable name with a subscripted idloop name. For example, "loop1[0].C" represents the instance of "C" identified during the first iteration of the idloop "loop1". In general, an instance of a variable is specified by qualifying the name of the variable with subscripted names of the enclosing idloops.

A variable could also be explicitly declared/defined using the <amlvar>element.

C.1. Variable definition

Variable are created using the amlvar element. The scope of a variable is global to an audio page. Its lifetime is until the audio page is being referenced in a user session. The name of the variable must be unique for an audio page. A variable has the following attributes which help define the name, type, etc. of the variable.

```
name                                # name of the variable
format  = mmddy4/y4/ etc    # how is this variable in HTML page
render  = mmddy4/y4/ etc.   # how do you want to audio-render it?
type    = date/time/int/char/money  # type of variable
visible                             # visible part of text. i.e.. what you see on
                                    # the screen, see Section 5.5. essentially
                                    # stripping out the HTML tags from the
string
```

The following notation describes a variable x which encodes a field of type "date":

```
<amlvar name=x type='date' format='mmddy4' render='y4'></amlvar>
```

C.2. Variable usage

All variables are objects containing the following elements:

```
            vector = yes/no  // yes => vector, no => scalar
            length = 1       // length of vector
            rowspan          // if tr variable, length of row
            colspan          // if td variable, length of column
            action           // action method of form, see Section 5.4,
            define           // used to define value of case, see
Section 5.7
            anchor           // associated anchor element, see
Section 6.2.1
```

Thus, a loop, named var1, could be accessed using the variable Samlvar(varl). The following would be true of the varl object:

var1 { vector=yes; length=# elements in loop:

Similarly a variable cell1, which represents a cell element in the table, could be accessed using the notation Samlvar (cell1), and its fields could be accessed as Samlvar (cell1.vector), Samlvar(cell1).colspan. etc. If cell1 was in the fifth iteration of the loop var1, then the anchor element associated with cell1 could be accessed as Samlvar (var1[4].cell1.anchor).

C.2.1. Global system variables

Variables can be marked as "global". Their defintions are available across all pages that are traversed subsequently. The order of accessing of variables is: local variables (loop indexes), page variables (variables extracted from the page), followed by global variables.

amlerror

The amlerror variable is a system variable which exposes errors to the user. The variable is an object and has the following fields:

```
                  amlerror = {
                  ERROR type;                           // type of current error
                  int           number_errors_step:     // number of errors of this
type in the current step
                  int           number_errors_page      // number of errors of this
```

-continued

```
type in the current page
                        int      number_errors_session;  // number of errors of this
type in the phone session
                        }
```

The user can refer to the type of the error as Samlvar (amlerror.type). The errors can be one of the following types:
ERROR={
RECOGNITION_FAILURE,
CALLER_TIMEOUT,
OTHER_ERROR,
WRONG_NUMBER_DIGITS
{
The following table describes default action taken on error for the following error conditions.

```
Error type    Input
RECOGNITION_FAILURE 1) Retry specified # times, unless
session max. exceeded, then never try
              2) Try shadow prompt
              3) Present navigation menu to caller
WRONG_NUMBER_DIGITS
CALLER_TIMEOUT1) Repeat previous prompt and input # times
              2) Present navigation menu
```

C.3. Identification of components

Components can be combined into regular expressions. Components can be identified, including such components as forms, tables, and lists on an HTML page. A component can be identified using one of two broad techniques:

Identify type (e.g., form, table, tr, td, etc.) and one or more of name/position/URL/dimension.

Identify "structure" of the component. This all-encompassing method can be the only method chosen. However, it needs much more user interaction than type identification. In many cases it would be easier for the user to use one of the other mechanisms. Therefore the designer should be allowed to move forward from easier to more difficult methods of identification.

Keeping in mind the preference for workflow to the designer, the following methods of identification are provided:

1) Type: What is the type of the object, e.g., form, table, row, cell, cell, input, etc. E.g., <component name="keywordsearch" type="form">// component is a form
2) ID: Some components may be uniquely identifiable because they are given a unique <ID> on the HTML page.
   <component name="table1" class=class1 id=table1>
3) HTMLname: name attribute on the HTML page
4) Position: Specifies the ordinal number of that type of component in the subtree of the HTML parse tree rooted at the HTMLnode corresponding to the parent aml component. The second row of the first table in the document could be specified as
   <component name="tab1" type="table" position="1">
      <component name="Interesting_row" type="tr" position="2">
      </component>
   </component>

Note that the position is the rank among the sub-containers of the same type within the parent container.

Similarly the second table on the second frame can be specified using the following nested specification:
   <component name="keywordsearchframe" type="frame" position="2">
      <component name="keywordsearchform" type="form" position="2">
      </component>
   </component>

Similarly, if Table A has nested within it Table B, and Table B has Table C nested within it, then Table C could be specified with nested component specification as:
   <component name="A" type="table" position="1">
      <component name="B" type="table" position="1">
         <component name="C" type="table" position="1">
         </component>
      </component>
   </component>

5) URL: A fixed form can be specified using the action URL. E.g.,
   <component name="keywordsearch" type="form" url="www.amazon.com/kevword-search>"
6) Dimension: Fixed forms, tables, rows and lists can be specified using their dimensions. The sizes of tables and forms can be specified as follows:
   <component name="keywordsearch" type="form" dimension="3" form with 3 visible controls
   <component name="stockquotes" type="table" dimension="3">table with 3 rows
      <component name="row1" type="tr" dimension="2">//2 cells in the row
7) Structure: This is the choice of last resort, or if sub-component level information about the component is desired. The text in the component can be specified in terms of two types of objects:
   (a) quoted text which is matched exactly, and
   (b) any text specified by the tag amlvar A form could be specified as:
   structure="<form> <amlvar name='formbody'></form>"
where "<form>" and </form> are matched exactly, and the entire body of the form is matched by the variable-text element <amlvar> and is assigned to the variable formbody.

If multiple conditions are used to specify the page then they all must be true. For example, in the following identification the component being identified is of type form and has an action method which is the value "vwww.amazon.com/keyword-search, has 3 inputs, and is the first form on the page":
   <component
      name="keywordsearch"
      url="www.amazon.com/keyword-search"
      type="form"
      position="1"
      dimension="3">

In some cases, a component cannot be identified unambiguously by itself. In such cases, it must reference its parent subtree until it reaches an ancestor which can be unambiguously identified. Consider a parse tree, where it is necessary to identify the second cell in the second row of table level2 and consider where the number of cells in any of the rows in table level1 are not pre-determined. All that is known is that the last cell in the last row in level1 has the table level2 embedded within it. The lowest cell might be identified as:

```
    <component name="level1" type="table" position="1"
        <component name="level1_row" type="tr" position=
           "2"
//[comment: It may not be necessary to specify the row in the
    above line]
        <component name="cell2" type="td" position="2">
            <component name="level2" type="table" position=
                "1">
//position is relative to parent
            <idloop ignore="ALL_BUT_LAST">
                <component name="first_rows" type="tr"></
                    component>
            </idloop>
//[comment: The above is the first set of rows]
            <component name="last_row" type="tr">
            <idloop ignore="ALL_BUT_LAST">
//[comment: The above is the first set of cells]
                <component name="first_cells" type="td">
                </component>
            </idloop>
            <component name="last_cell" type="td">
            </component>
            </component>
            </component>
            </component>
            </component>
            </component>
```

Once a component is identified, the data within the component can be extracted.

C.4 Extraction: forms

Consider an example form such as a broker's sign-on page. This form has two inputs specified by the user: name and password. The remaining inputs are hidden elements as far as the user is concerned. There is also an option list to specify where the user wants to start the session.

The HTML code for such a form is shown below:

```
<FORM NAME="SignonForm"
ACTION="https://trading2.schwab.com/trading/signon/."
    METHOD="POST"
TARGET="_self">
<table>
    <tr> <td> Account Number </td> <td> <INPUT TYPE=
        "text"
NAME="SignonAccountNumber"  SIZE=11
    MAXLENGTH=9> </td></ tr>
    <tr><td> Password </td><td> <INPUT TYPE=
        "password"
NAME="SignonPassword" SIZE=11 MAXLENGTH=8>
    </td></tr>
    <tr><td> Select </td> <td>
    <SELECT NAME=StartAnchor>
        <option Value=CCbodyi>Account Overview
        <option Value=TradingEQ>Stock Trading
        <option Value=TradingOpt>Options Trading
        <option Value=TradeMF>Mutual Fund Trading
        <option Value=TradeCorpBonds>Corporate Bond
            Trading
        <option Value=Quotes>Real-Time Quotes
        <option Value=Balance>Account Balances
        <option Value=Position>Positions
    </select>
    <INPUT TYPE=HIDDEN NAME=PARMS VALUE="
        ">
    <INPUT TYPE=HIDDEN NAME=ShowUN VALUE=
        "YES">
    <INPUT TYPE=HIDDEN NAME=SANC VALUE=" ">
    <INPUT TYPE=HIDDEN NAME=NewsURL>
    <INPUT TYPE=HIDDEN NAME="QCdata">
    <INPUT TYPE=HIDDEN NAME="page">
    <INPUT TYPE=HIDDEN NAME="story">
    <INPUT TYPE=HIDDEN NAME="symbols">
    <INPUT TYPE=HIDDEN NAME="watch_list">
    <INPUT NAME="SignonSubmit" TYPE="Submit"
        VALUE="Submit"></td></tr></table></form>
```

The component specifies that there is one form of interest on this page, and it is placed as the first form on the page, namely:

```
    <component Name="Logon" TYPE="FORM" position=
        "1"></component>
```

The action method of the form can be extracted using the following structure specification (where the tag amlvar describes any free-matched text):

structure="<form> <amlvar> action=<amlvar name= 'url'>METHOD <amlvar>">

This is interpreted as follows:

Start off by matching <form, then there is text until you match action=", then the next part is a variable from the HTML page, which ends when you reach METHOD. Name the component Logon. Refer to the variable "url" as Samlvar (Logon.url).

Consider the following text in a page:

---

11/11/98  16:47  (UPDATE) VocalTec. Cisco To Develop Products For Voice Calls Over Internet [Dow Jones Online News]
12/12/98  17:58  (UPDATE) WebByPhone introduces intelligent voice browsing [Dow Jones Online News]
12/12/98  17:58  (UPDATE) WebByPhone Corporation is formed [Dow Jones Online News]

---

The source HTML language for the above table is as follows:

```
<TABLE BORDER=0 WIDTH=430 CELLPADDING=0
    CELLSPACING=2>
<TR ALIGN=LEFT>
<TD VALIGN=TOP><FONT COLOR="#000000"
FACE="ARIAL.HELVETICA"CLASS="NORM" SIZE=
    2>11/11/98</FONT><TD>
    <TD WIDTH="5"><IMG
SRC="http://gsf.quote.com/fast/graphics/trading3/
    blank.gif" WIDTH="1" HEIGHT="1"
BORDER=0><TD>
    <TD VALIGN=TOP><FONT COLOR="#000000"
FACE="ARIAL.HELVETICA" CLASS="NORM" SIZE=
    2>16:47</FONT><TD>
    <TD WIDTH="5"><IMG
SRC="http://gsf.quote.com/fast/graphics/trading3/
    blank.gif" WIDTH="1" HEIGHT="1"
BORDER=0></TD>
    <TD     VALIGN=TOP><FONT     FACE=
        "ARIAL.HELVETICA" CLASS="NORM" SIZE=
        2><U><A HREF="/fq/trading3/news? story=
        8176218&symbols=csco">(UPDATE) VocalTec.
        Cisco To Develop Products For Voice Calls Over
```

Internet</A></U></FONT> <FONT COLOR="#000000" FACE="ARIAL.HELVETICA" CLASS="SMALL" SIZE=1>[ Dow Jones Online News ]</FONT></TD>
</TR>
<!--The rest of the rows are cut. -->
<!--They all have the same syntax. -->
</TABLE>

The table above has a variable number of rows, each of which has 5 cells. Of this table, only cells 1, 3, and 5 are intended for use. The structure of the table can be described as follows:

<component name="headline" type="table" position="1">
 <idloop name="headlines">
   <component name='news_item' type='tr'>
     <component name="cell1"type="td" position="1"
       structure="<amlvar> SIZE=2> <amlvar name='date'
       type='date'></FONT></TD>">
     </component>
     <component name="cell3"type="td" position="3"
       structure="<amlvar> SIZE=2> <amlvar name=
       'time' type='time'> </FONT></TD>">
     </component>
     <component name="cell5"type="td" position="5"
       structure="<amlvar> SIZE=2> <amlvar name=
       'headline' type='text'> </A></U> <amlvar>">
     </component>
   </component>
 </idloop>
</component>

The specification of each cell using the structure mechanism seems convoluted because of the HTML constructs appearing in the specification. One simplification is to have the structure refer to the "visible" part of the cell—this is what the user sees on a regular web browser.

<component name="headline" type="table" position="1">
 <idloop name="headlines">
   <component name='news_item' type='tr'>
     <component name="date" type="td" position="1"
       visible="true"></component>
      <component name="time" type="td" position=
       "3" visible="true"></component>
     <component name="cell5"type="td" position="5"
       structure="<amlvar>
       HREF=<amlvar name='url'>><amlvar name=
       'news' visible='true'> </A<amlvar>">
     </component>
   </component>
 </idloop>
</component>

The variables can be referred to as Samlvar(headlines[index].date). Samlvar(headlines[index].time), and Samlvar(headlines[index].news). Further, the anchor element of the 5th column could be referred to as Samlvar(headlines[index].url)

C.6 Extraction: looping variable component (e.a. list)

A variable component is one whose structure may change from one version of the HTML page to another. For example, when searching for a book on amazon.com, the results constitute a variable component, because the components cannot be identified as rows/cells of a table. It is possible though to have a generic specification of how the sub-components of a component are defined. In the source HTML, each component is started with a <dt> tag, and ended with the <p> tag.

<dl>
<dt><b><a href="/exec/obidos/ASIN/0471880736/qid=909790477/sr=1-1/002-5206325-4441208">Design and Inference in Finite Population Sampling (Wiley Series in Probability and Mathematical Statistics)</a></b>~<NOBR><font color=#990033>Ships in 2–3 days</font></NOBR><dd> A. S. Hedayat (Contributor). B. K. Sinha/Paperback/Published 1991 <br> Our Price: $101.00 <br> <a href="/exec/obidos/ASIN/0471880736/qid=909790477/sr=1-1/002-5206325-4441208"><i>Read more about this title . . . </i></a><p>
<dt> . . .

The above is an example of a component from a site labeled amazon.com. The result component could be specified as follows:

<component name="resultssection" type="body">
  <component name="list" type="dl">
    <idloop name="resultsection2">
      <component name="item" type="dt">
      </component>
    </idloop>
  </component>
</component>

In the above specification, there is a fixed header component "<dl>" followed by a loopingz component. In each iteration of the looping component we need to identiy the following sections:

Title=Design and Inference in Finite Population Sampling (Wiley Series in Probability and Mathematical Statistics)
Shipping=Ships in 2–3 days
Author=A. S. Hedayat(Contributor), B. K. Sinha
Type=Paperback
Date=1991
Price=$101.00

To extract the above sections, the result component could be described as follows:

<component name=resultssection>
  <component name="list" type="dl">
    <idloop name="loop1">
      <component name="item" type"dt"
        structure="<dt> <b> <amlvar name='title' visible=
        'true'> </b><nobr> <amlvar name='shipping'
        visible='true'> </nobr><amlvar> <dd><amlvar
        name='author' visible='true'>/<amlvar name=
        'type' visible='true'>/Published<amlvar name=
        'date' visible='true'> <br> <amlvar> Price: <amlvar name='price' visible='true'> <br><amlvar
        name='detail'visible='true'><p>"
      </component>
    </idloop>
  </component
</component>

The title text can be referred to as Samlvar(loop1[index].title); information about the title can be accessed as Samlvar(loop1[index].detail).

C.7 Extraction: alternate structures

In the best case, a component of interest to the user may, be identified using exactly one method. However, there may be cases in which the same form may appear as the 1st/3rd form on a page, or a table may appear with 3 or 4 cells. Extending the identification of components using unique structures to identification of components with alternate structures vields the following examples:

EXAMPLE 1

Consider the following table (transaction history table from a stock quote site) where the rows are of three different types.

| Stock | Price | Quantity | Operation | Date |
|-------|-------|----------|-----------|------|
| IFMX  | 10.50 | 100      | BUY       | 5/25/98 |
| ORCL  | 51.5  | 200      | SELL      | 5/26/98 |
| IBM   | 171.5 |          | DIVIDEND  | 5/27/98 |
| IBM   | 51.5  |          | INTEREST  | 5/28/98 |

In this case, since the rows do not represent the same "types" of transactions they may need to be read out in different formats. Also, their input is organized differently. The rules for this table can be as follows:

it is a transaction of type interest.
it is a transaction of type dividend.
it is a buy/sell transaction.

To specify the above table:

```
<component name="transaction" type="table" position="1">
    <idloop name="transactionList" loopindex="index"><idswitch name="switch1">
    <idcase define="INTEREST">
        <component name="intrst" type="tr" structure="<amlvar>interest<amlvar>">
            <component name=icol1 type="td" position=1></component>.
            <component name=icol2 type="td" position=2></component>
            <component name=icol3 type="td" position=3></component>
            <component name=icol4 type="td" position=4></component>
            <component name=icol5 type="td" position=5></component>
        </component>
    </idcase>
    <idcase define="DIVIDEND">
        <component name="dvdnc" type="tr" structure="<amlvar>dividend<amlvar>">
            <component name=dcol1 type="td" position=1></component>
            <component name=dcol2 type="td" position=2></component>
            <component name=dcol3 type="td" position=3></component>
            <component name=dcol4 type="td" position=4></component>
            <component name=dcol5 type="td" position=5></component>
        </component>
    </idcase>
    <idcase define="default">
        <component name="intrst" type="tr" >
            <component name=col1 type="td" position=1></component>
            <component name=col2 type="td" position=2></component>
            <component name=col3 type="td" position=3></component>
            <component name=col4 type="td" position=4></component>
            <component name=col5 type="td" position=5></component>
        </component>
    </idcase>
    </idloop>
</component>
```

The invention has been described with reference to specific embodiments. Other embodiments will be evident to those of ordinary skill in the relevant art. It is therefore not intended that the invention be limited, except as indicated by the appended claims.

What is claimed is:

1. In a computer network system having storage means tor source data and means for identification of said source data, a method for converting said source data of an element of interest conventionally presented in a first visual format and which is part of a mathematically regular expression into a canonical representation for rendering said source data in alternative formats, including aural formats and a second visual format, said converting method comprising:

retrieving from a source said source data as two-dimensional data of mathematically regular expression form into said storage means;

locating a unique container of the element of interest within a parsed tree of the mathematically regular expression; thereafter following a unique local route of the element of interest within the parsed tree to obtain a signature of the element interest, said signature being said canonical representation, said signature comprising said unique container and said unique local route; and storing said signature in said storage means for later use in retrieving and rendering a value of the element of interest.

2. The method according to claim 1 further including:
searching for repeated representations of said element; and
identifying all said repeated representations in reference to said signature.

3. The method according to claim 1 further including:
searching for repeated instantiations of the selected element; and
storing only one representation of the instantiation.

4. The method according to claim 3, wherein said one instantiation is the first repeated element.

5. The method according to claim 1 further including:
identifying each said selected element.

6. The method according to claim 1 further including:
customizing the stored representation of said selected element for rendering said selected element for an intended context.

7. In a computer network system having storage means for source data and means for identification of said source data, a method for converting said source data of an element of interest conventionally presented in a first visual format and which is part of a mathematically regular expression into a canonical representation for rendering said source data in alternative formats, including aural formats and a second visual format, said converting method comprising:

creating a target language component for a source language component as selected by a designer;

obtaining values for attributes of said target language component;

testing said target language attributes to determine if target language attributes uniquely specify said target component in its parent container:

if not, selecting a sequence of "left" sibling components such that said sequence followed by said target language component has a unique signature in the context of said parent container;

including said sequence in a specification of said target language component testing other target language components at the current level to determine if said other components need to be specified at the current level: if so, obtaining specifications of said other components of interest at the current level;

testing for uniqueness of specification at the current level; and upon establishing uniqueness of specification, outputting a script of said target language.

8. The method according to claim 7 wherein said testing for uniqueness of specification includes:

determining if the subject specification is part of a case-type specification at the current level; and if so obtaining specification for all other patterns at the current level; and defining an identification switch component to enclose all the patterns so obtained.

9. The method according to claim 8 wherein said testing for uniqueness of specification further includes:

determining if said specification is part of a repeating pattern; and if so defining an an identification loop which encloses the current specification.

10. The method according to claim 9 wherein said testing for uniqueness of specification further includes:

testing the currently-defined specification against other specifications on the same HTML page to determine if the current specification is unique: and if not, then obtaining type information about ancestor containers; and defining enclosing AML components to reflect containment properties in said HTML page.

* * * * *